Patented Feb. 16, 1943

2,311,183

UNITED STATES PATENT OFFICE 2,311,183

TRI-(CYANOETHYL)-ACETONE

Herman A. Bruson, Philadelphia, Pa., assignor to The Resinous Products & Chemical Company, Philadelphia, Pa., a corporation of Delaware No Drawing. Application February 7, 1942, Serial No. 429,957

5 Claims. (Cl. 260—464)

This invention relates to tri-1,1,1-(β-cyanoethyl)-acetone, a new substance having the formula:

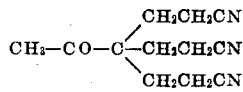

and a method for its preparation.

This compound is a valuable intermediate for the preparation of synthetic resins, plasticizers, and drugs.

According to the present disclosure, which is a continuation-in-part of co-pending applications Serial No. 389,332, filed April 19, 1941, and Serial No. 415,405, filed October 17, 1941, the above compound is obtained by condensing acetone in the presence of an alkaline condensing agent with acrylonitrile.

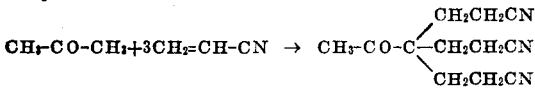

Typical alkaline condensing agents which can be used include the oxides, hydroxides, amides, hydrides, alcoholates or phenolates of the alkali metals, the alkali metals themselves or strongly basic non-metallic hydroxides such as quaternary ammonium hydroxides. Of these agents, one of the most effective is the aqueous 40% solution of trimethyl benzyl ammonium hydroxide commercially available under the trade name "Triton B." The quantity of alkaline condensing agent used is small, amounts of the order of 0.5% to 5% on the combined weight of the reactants being sufficient to catalyze the reaction.

The condensation can be carried out in the presence or absence of a solvent such as benzene, dioxane, or tertiary butanol. It takes place at temperatures as low as 0° C. and is greatly accelerated at temperatures from 25° to 40° C. Since the reaction is strongly exothermal, it is advantageous to use an inert solvent and to regulate the vigor of the reaction by the rate of addition of the acrylonitrile or by suitable cooling.

The following examples illustrate this invention:

Example 1

To a mixture consisting of 38 grams of acetone and 100 grams of tertiary butanol cooled to 10° C. there is added 5 grams of aqueous 40% trimethyl benzyl ammonium hydroxide and, while the mixture is stirred, there is added dropwise thereto 53 grams of acrylonitrile during a period of a half hour while the reaction temperature is maintained between 10° and 15° C. by cooling in an ice bath. After about one-fourth of the acrylonitrile has been added, the product begins to crystallize. Stirring is continued for two hours at 10—20° C. after all the acrylonitrile has been added, and then for three hours longer at room temperature. The reaction mixture is then made slightly acid to litmus by adding a 10% hydrochloric acid solution, whereupon the solution lightens in color. The crystals are filtered off by suction. The yield is 50.5 grams. Upon recrystallization from boiling water or from glycol monoethyl ether ("Cellosolve"), the tri-1,1,1-(β-cyanoethyl)-acetone forms colorless crystals melting at 154° C.

Example 2

To a solution consisting of 29 grams of acetone, 50 grams of tertiary butanol and 2.5 grams of alcoholic 30% potassium hydroxide solution, cooled to 0° C., there is added dropwise, with rapid stirring, a solution consisting of 80 grams of acrylonitrile and 37 grams of tertiary butanol, during a period of 1½ hours while the reaction mixture is maintained at a temperature between 0° and 5° C. The mixture is stirred thereafter for two hours at 5° C. and the crystalline product is filtered off. The yield is 84 grams of pale yellow crystals of crude tri-1,1,1-β-cyanoethyl)-acetone, which, after recrystallization from hot water, melts at 154° C.

I claim:

1. As a new compound, tri-1,1,1-(β-cyanoethyl)-acetone

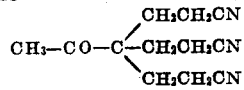

which, when pure, consists of colorless crystals melting at 154° C.

2. A method for preparing tri-1,1,1-(β-cyanoethyl)-acetone which comprises condensing acetone with acrylonitrile in the presence of an alkaline condensing agent.

3. A method for preparing tri-1,1,1-(β-cyanoethyl-acetone which comprises condensing acetone with acrylonitrile in the presence of an alkaline condensing agent and a solvent.

4. A method for preparing tri-1,1,1-(β-cyanoethyl)-acetone which comprises condensing acetone with acrylonitrile in the presence of trimethyl benzyl ammonium hydroxide.

5. A method for preparing tri-1,1,1-(β-cyanoethyl)-acetone which comprises condensing acetone with acrylonitrile in the presence of potassium hydroxide.

HERMAN A. BRUSON.